United States Patent Office 3,033,785
Patented May 8, 1962

3,033,785
BACTERIA INHIBITED SOLUBLE OIL
COMPOSITION
Edward O. Bennett, Houston, Tex., assignor to Texaco Inc., a corporation of Delaware
No Drawing. Filed June 2, 1958, Ser. No. 738,990
5 Claims. (Cl. 252—33.3)

This invention relates to a soluble oil inhibited against bacterial action. More particularly, it relates to a bactericide-containing soluble oil particularly useful in the form of an emulsion as a metal working lubricant.

Soluble oils generally are composed of mineral oil or mixtures of mineral and vegetable oils, and an emulsifying agent to lower the interfacial tension between the oil and large volumes of water whereby emulsions of the oil-in-water type may be easily formed. The emulsifying agents commonly used include soaps of petroleum sulfonic acids, naphthenic acids, fatty acids, rosin and tall oil. Soluble oils usually contain coupling agents and small amounts of water to stabilize the composition prior to emulsification. Various lubricant additives are also used to correct or improve certain characteristics of the soluble oil or soluble oil emulsion.

The oil-in-water emulsions are formed with water-to-oil ratios ranging from 5:1 to 100:1. The more dilute emulsions, from 25:1 to 100:1 are preferred for cutting oils which are used as lubricants and coolants in high speed metal turning operations.

The soluble oil itself is shipped to the user, in a substantially sterile condition. However, bacteria can be introduced in an emulsified soluble oil either through the water used in the preparation thereof or through contamination by the workers or from the air during use. The bacteria, if allowed to grow unchecked, will eventually cause breakdown of the emulsion and curtail the use for which it was intended.

In addition to the above occurrence, a serious odor problem is created by certain bacterial growth in the cutting fluid. It is believed that initially the growth of aerobic bacteria takes place with a resulting slight breakdown of the emulsion. During shutdown periods of the cutting machinery, as on weekends and holidays, anaerobic sulfate-reducing bacteria grow quickly in the used cutting fluid due to inadequate aeration in the quiescent system and to the conditions or material provided by the prior growth of aerobic bacteria in the fluid. The presence of large amounts of sulfate-reducing bacteria causes severe odor problems due to the formation of sulfides, and the odor is particularly noticeable on Monday mornings after weekend shutdown periods. The growth of anaerobic bacteria also causes a quicker and more severe emulsion breakdown than is caused by aerobic bacteria necessitating draining and cleaning of the cutting fluid system and the addition of new cutting fluid.

The problem of finding a satisfactory bacterial inhibitor for a soluble oil is made difficult by a number of factors which must be considered. These factors include toxicity, oil solubility, storage stability, emulsion degradation, additive compatibility and growth inhibition of harmful bacteria for a sufficient period during the life of the oil.

In accordance with the present invention a soluble oil composition which will meet the above requirements contains a bacteria-inhibiting amount of a hydroxy substituted nitrobutane. Examples of the bactericide compounds of this invention include 2-nitro-1-butanol, 3-nitro-1-butanol, 4-nitro-1-butanol, 1-nitro-2-butanol, 1-nitro-3-butanol, 2-nitro-2-butanol, 2-nitro-3-butanol, and the hydroxy substituted nitro-isobutanes such as 2-nitro-2-methyl-1-propanol, 3-nitro-2-methyl-2-propanol and 3-nitro-2-methyl-1-propanol. The preferred nitro-butanol for bacteria inhibition of soluble oils and soluble oil emulsions is 2-nitro-1-butanol.

The nitro-butanols are effective bactericides in soluble oil emulsions in amounts ranging from about 25 to 2500 p.p.m. The amount of these bactericides placed in soluble oils in order to obtain the proper concentration in the formed emulsions ranges from 0.1 to about 6 percent by weight based on the oil.

The soluble oil mainly comprises a mineral lubricating oil and an emulsifying agent. The mineral oil is preferably a naphthene base distillate oil although mixed paraffin-naphthene base distillate oils are at times effectively employed. Naphthene base distillate fractions are desirable because of their better emulsification properties and stability. In general, refined base oil fractions having an SUS viscosity at 100° F. between 70 and 800 are used in the formulation of the soluble oils of this invention.

The emulsifying agents useful in the present invention are those known in the art. Examples of these emulsifiers include oil soluble metal petroleum sulfonates, alkali metal naphthenates, and resinates, salts of fatty and carboxylic acids, such as guanidine salts of high molecular weight fatty acids and alkylolamine salts of carboxylic acids containing at least 10 carbon atoms, alkali metal salts of tall oil, etc. These soaps or salts are usually formed with sodium because of the lower cost and availability, but potassium is also used. Mixtures of emulsifiers, for example a mixture of sodium naphthenate and sodium petroleum sulfonate, a mixture of sodium resinate, sodium naphthenate and sodium petroleum sulfonate, and a mixture of guanidine stearate and triethanolamine stearate have been found extremely useful.

The total emulsifier concentration is between 10 and 20 percent by weight of the total soluble oil composition with concentrations between 12 and 16 percent usually employed.

Minor amounts of coupling agents are also advantageously employed in the soluble oil composition to improve the texture and stability thereof. Those coupling agents useful in this invention include mono and polyhydroxy alcohols, ether-alcohols, and phenols. Examples of these compounds include ethyl, isopropyl, n-propyl, isobutyl, n-butyl and n-amyl alcohols; ethylene glycol, diethylene glycol and propylene glycol; ethylene glycol monoethylether (Cellosolve), ethylene glycol monoisopropylether, ethylene glycol monobutylether, ethylene glycol mono-n-pentylether, ethylene glycol mono-n-hexylether, diethylene glycol monoethylether (Carbitol), diethylene glycol monobutylether and cresol. The concentration of the coupling agents in the soluble oils is usually between 0.1 and 1.5 percent by weight. A preferred coupling agent is ethylene glycol monobutylether at a concentration of about 0.6–1.0 percent by weight.

In preparing the soluble oil of this invention a small amount of water is preferably used to make the soluble oil fluid and to prevent oil separation, or stratification of the emulsion, upon mixing the soluble oil with much larger amounts of water. The water content, to stabilize the oil, usually falls between 1 and 4 weight percent. A water content of about 2 percent has been found to be particularly effective in the soluble oil composition.

Other useful lubricant additives, to improve certain characteristics of the soluble oil, are at times used in the composition. These include, for example, rust preventatives such as triethanolamine, extreme pressure and oiliness agents, and settling agents.

In order to determine the value of compounds, known or expected to have bacteria destroying properties in water solutions, as bactericides in soluble oil emulsions, a screening test was used. This test consisted of preparing the cutting fluids or soluble oil emulsions and adding 100, 500, and 1000 p.p.m. of each bactericide to 20 ml. of the emulsion in test tubes. The tubes were then autoclaved at 15 pounds steam pressure for 15 minutes. After the tubes had cooled to atmospheric temperature, 0.5 ml. of a composite used cutting oil samples or inoculum was prepared by mixing the "spoiled" cutting oil samples of several users. The bacterial content of the inoculum was determined and in every case the tubes were inoculated with a standard known number of viable bacteria. Tubes of sterile uninhibited uninoculated emulsions and uninhibited inoculated emulsions were employed as controls. All tubes were placed on a shaking machine making 209 oscillations per minute. Immediately after inoculation of the emulsions and at 24 hour intervals for a period of 7 days, each tube was tested for the presence of viable bacteria by inoculating nutrient broth with a small standard volume of emulsion. The broth tubes were incubated for 48 hours and then examined for bacterial growth. Those bactericides which caused the inoculated emulsions to become sterile within the seven day test period were considered promising and were subjected to further testing. Of over 250 known bactericides tested in the above manner less than a third were considered promising for bacteria inhibition of soluble oils.

Effective materials found with the above test procedure were further tested in an Open System Test. The procedure consisted of placing 3.0 gms. of powdered iron and 3000 ml. of a 25:1 soluble oil emulsion containing the experimental bactericide in a one gallon jar and inoculating with a known quantity of bacteria. The soluble oil consisted of a naphthene base distillate oil having an SUS viscosity at 100° F. of about 72, 7.5 percent sodium resinate, 12.0 percent sodium petroleum sulfonate, 1.0 percent ethylene glycol monobutylether, 0.5 percent triethanolamine and 2.0 percent water. The system was then aerated for 5 days and allowed to stand quiescent for 2 days each week. Immediately after inoculation and twice a week thereafter duplicate standard plate counts were made. The inhibitors were considered effective as long as bacteria counts remained less than 1000/ml.

The following table shows the results of the Open System Test on the potential bactericides:

Table I

| | No. of Effective Days of Inhibition | | |
|---|---|---|---|
| | 100 p.p.m. | 500 p.p.m. | 1,000 p.p.m. |
| Sodium o-phenylphenate | | | 32 |
| o-Phenyl phenol | | 32 | 39 |
| Resorcinol | | | 0 |
| Resorcinol dibenzoate | | | 0 |
| Alkylamine o-phenyl phenol | 0 | 0 | 0 |
| Mercuric naphthenate | 0 | 4 | 4 |
| Zinc salt of alkyl-N-propylene-diamine-pentachlorophenol | | | 0 |
| Pentachlorophenol | | | 0 |
| Tetradecylamine salt of o-phenyl phenol | | | 0 |
| Dichlorophene | | | 28 |
| Copper naphthenate, 8% | 0 | 0 | 0 |
| Azochloramide | 11 | 14 | 21 |
| Mixture of 4 and 6 chloro-2-phenyl phenol | 0 | 0 | 18 |
| Methylene bis-phenol | 0 | 0 | 0 |
| Tetrachlorophenol | 0 | 0 | 0 |
| Mixture of o and p-dimethyl-aminomethyl phenol | 0 | 0 | 18 |
| 2,4,6-Tri(dimethylaminomethyl) phenol | | 18 | 18 |
| Beta-propiolactone | | | 26 |
| Diethyl acid pyrophosphate | | 2 | 20 |
| m-Cresol | | | 22 |
| 2-Methyl-1,4-naphthoquinone | | | 26 |
| 2-Phenyl ethylamine | | 8 | 26 |
| Malonic acid | | | 8 |
| 1,2-Dibromo-1, dichloroethane | | 0 | 0 |
| Hydroxylamine HCl sol | 20 | 22 | 26 |
| Mixture of 2,8-diamino-10-methyl acridinium chloride and 2,8-diamino acridine | | | 8 |
| Ditto, HCl, sol | | | 2 |
| Dichloro-m-xylenol | | | 36 |

Table I—Continued

| | No. of Effective Days of Inhibition | | |
|---|---|---|---|
| | 100 p.p.m. | 500 p.p.m. | 1,000 p.p.m. |
| 10% Phenylmercuric acetate | | 27 | 27 |
| Organic mercurial (Exact chemical composition not known) | | | 22 |
| 1,2 - Dichlorohexafluorocyclopentene-1 | | | 0 |
| Cyclohexyl chloride | | | 0 |
| 2-Amino-1,4 naphthoquinone | 10 | 26 | 30 |
| Propyl-p-hydroxybenzoate | | | 8 |
| Butyl-p-hydroxybenzoate | | | 2 |
| p-Chloro-m-xylenol | 3 | 6 | |
| Lauryl isoquinolinium bromide | | | 2 |
| Phenylmercuric monoethanol-ammonium acetate | | | 53 |
| Zinc salt of dimethyl dithiocarbamic acid | | | 26 |
| 3,5-Dibromo-2-phenyl mercurioxy benzoic acid | | 69 | 83 |
| Sodium salt of dibromohydroxy mercuri fluorescein (mercurochrome) | | 9 | 31 |
| Phenyl mercuric salicylate | | 15 | 15 |
| 1-Hydroxy-2-(1H)-pyridine-thione (zinc salt) | | | 9 |
| 1-Hydroxy-2-(1H)-pyridine thione (copper salt) | | | 13 |
| Morpholine silicofluoride | | | 2 |
| Rosine amine silicofluoride | | | 2 |
| Tris(hydroxymethyl)amino methane | | | 0 |
| Tris(hydroxymethyl(nitro-methane | | | 55 |
| Nitromethane | | | 0 |
| Nitroethane | | | 0 |
| 1-nitropropane | | | 0 |
| 2-nitropropane | | | 0 |
| 1-Chloro-1-nitro-propane | | | 0 |
| 2-Chloro-2-nitro-propane | | | 0 |
| 1,1-Dichloro-1-nitro-propane | | | 0 |
| 2-Amino-2-ethyl-1,3 propane-diol | | | 0 |
| 1,4-dichlorobutane | | | 0 |
| Butanol | | | 0 |
| 1-Nitro-3-methyl-2-butanol | | | 0 |
| 2-Nitro-1-butanol | | 87 | 108 |

In the above data, 100 p.p.m., 500 p.p.m. and 1000 p.p.m. correspond respectively to about 0.25, 1.25 and 2.50 percent by weight of the potential bactericides in the soluble oil before the formation of the 25:1 dilution emulsion.

In addition to the above findings, 3-nitro-2-pentanol was found ineffective in the previously described screening test.

From the above data it can easily be concluded that the compounds of the invention are exceptional aerobic bacteria inhibitors in soluble oil emulsions.

Some of the compounds listed in the foregoing Table I were effective in this test. However they were objectionable as either completely insoluble in soluble oil per se, decomposed in the soluble oil in storage, degraded soluble oil emulsion properties, or could only be incorporated in the soluble oil by utilizing a special technique which entailed adding the potential bactericide to ethylene glycol monobutylether, which is usually incorporated as a coupling agent, heating this solution to 130° F. until the solution turned clear. The solution was then able to be added to the soluble oil.

Obviously, many modifications and variations of the invention, as hereinbefore set forth, may be made without departing from the spirit and scope thereof, and therefore only such limitations should be imposed as are indicated in the appended claims.

I claim:

1. An improved soluble oil consisting essentially of a major portion of an emulsifiable mineral lubricating oil, from 10 to 20 percent by weight of an oil-in-water emulsifying agent, and a bacteria inhibiting amount of 2-nitro-1-butanol.

2. An improved soluble oil consisting essentially of a major portion of an emulsifiable mineral lubricating oil, from 10 to 20 percent by weight of an oil-in-water emulsifying agent, and from 0.1 to about 6 percent by weight 2-nitro-1-butanol.

3. An improved soluble oil emulsion consisting essentially of about 5 to 100 parts of water, about one part of an emulsifiable hydrocarbon oil composition consisting essentially of a major portion of a mineral lubricating oil, from 10 to 20 percent by weight of an oil-in-water emulsifying agent, and from 25 to 2500 parts per million of 2-nitro-1-butanol.

4. An improved soluble oil emulsion as described in claim 3 containing from about 100 to 1000 parts per million of 2-nitro-1-butanol.

5. An improved soluble oil emulsion consisting essentially of about 25 to 100 parts of water; about one part of an emulsifiable hydrocarbon oil composition consisting essentially of a major portion of a naphthene base distillate oil having an SUS viscosity range at 100° F. of from 70 to 800, 12 to 16 percent by weight of a sodium salt of a compound selected from the group consisting of naphthenic acid, sulfonic acid, rosin and mixtures thereof, from 0.1 to 1.5 percent by weight of a coupling agent selected from the group consisting of monhydroxy alcohols, polyhydroxy alcohols, ether-alcohols, phenols and mixtures thereof, and from about 1 to 4 percent by weight of water; and from about 100 to 1000 parts per million of 2-nitro-1-butanol.

References Cited in the file of this patent

UNITED STATES PATENTS

| | | |
|---|---|---|
| 2,402,487 | Batchelder et al. | June 18, 1946 |
| 2,653,909 | Frazier | Sept. 29, 1953 |
| 2,668,146 | Cafcas et al. | Feb. 2, 1954 |

FOREIGN PATENTS

| | | |
|---|---|---|
| 421,189 | Italy | Mar. 19, 1947 |
| 107,419 | Australia | May 25, 1939 |

OTHER REFERENCES

Pivnick et al.: "Disinfection of Soluble Oil Emulsions," Journal of the American Society of Lubrication Engineers, March 1957 (pages 151–153).

"Fundamentals of Microbiology," by Frobisher, 5th ed., 1953, by W. B. Saunders Company, page 3.